Figure 4:
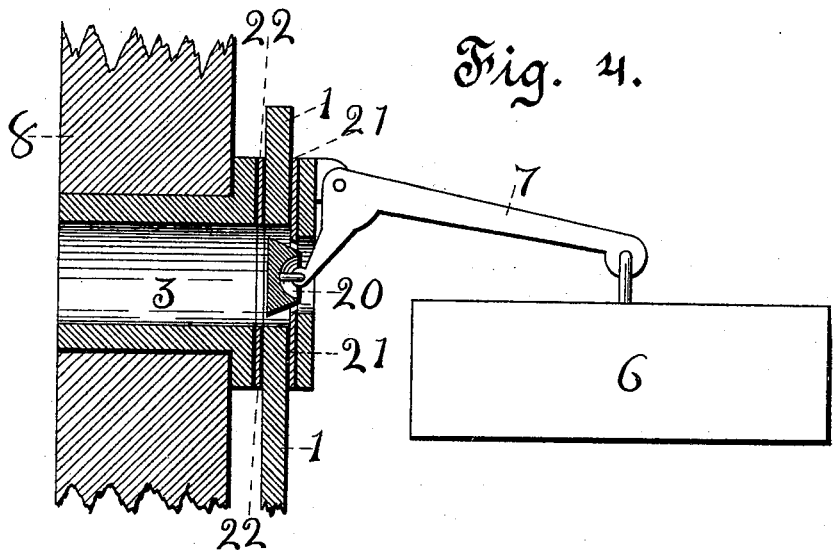

No. 616,986. Patented Jan. 3, 1899.
T. E. STEVENS.
AUTOMATIC WATERING TROUGH.
(Application filed May 23, 1898.)
(No Model.) 2 Sheets—Sheet 1.
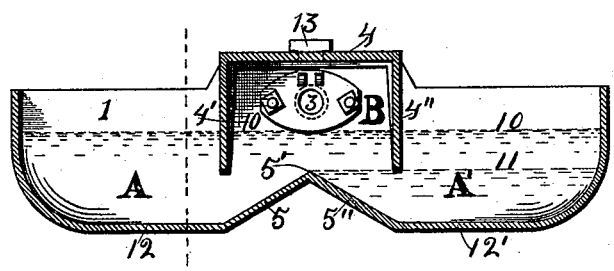
Fig. 1.
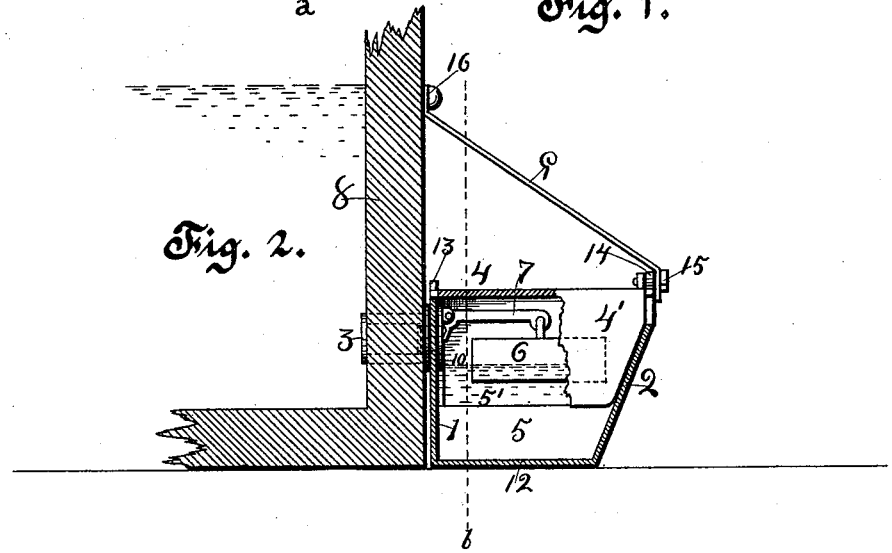
Fig. 2.
Fig. 3.
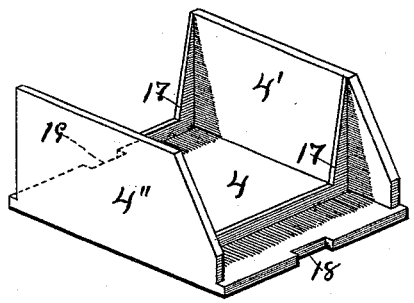
WITNESSES: Truman E. Stevens INVENTOR
W. E. David.
J. H. Struve. BY John Vaughan
his ATTORNEY.
THE NORRIS PETERS CO., PHOTO-LITHO., WASHINGTON, D. C.

No. 616,986. Patented Jan. 3, 1899.
T. E. STEVENS.
AUTOMATIC WATERING TROUGH.
(Application filed May 23, 1898.)
(No Model.) 2 Sheets—Sheet 2.

WITNESSES: Truman E. Stevens INVENTOR

BY Vaughan, his ATTORNEY.

UNITED STATES PATENT OFFICE.

TRUMAN E. STEVENS, OF BLAIR, NEBRASKA.

AUTOMATIC WATERING-TROUGH.

SPECIFICATION forming part of Letters Patent No. 616,986, dated January 3, 1899.

Application filed May 23, 1898. Serial No. 681,444. (No model.)

*To all whom it may concern:*

Be it known that I, TRUMAN E. STEVENS, a citizen of the United States, residing at Blair, in the county of Washington and State of Nebraska, have invented a new and useful Automatic Watering-Trough, of which the following is a specification.

My invention relates particularly to improvements in automatic watering-troughs for watering swine and is attached and connected to a larger supply-tank, the supply being regulated by a valve controlled by a float in a compartment or chamber of the watering-trough; and the objects of my improvement are, first, to provide a better, cheaper, and more easily-manipulated chamber to house the float, and, second, to prevent the accumulation of mud and other debris beneath and around the float. I attain these objects by the construction illustrated in the accompanying drawings, in which—

Figure 1 is a longitudinal section on the broken line $b$ of Fig. 2, the float and lever that actuate the valve being removed. Fig. 2 is a cross-section on the vertical broken line $a$ of Fig. 1. Fig. 3 is a perspective view of the removable part of the float-chamber inverted; and Fig. 4 is a detail view of the valve and its connections on a larger scale, a vertical section showing the valve 20 forced open by the descent of the float and also showing the leather gasket 21, which serves as a valve-seat.

Similar letters and numerals refer to like parts throughout the several views.

The drawings illustrate a double watering-trough—that is, having two drinking-bowls A and A'—with an intermediate float-chamber B, through which the supply of water flows to the drinking-bowls. The supply to the chamber is through an inlet-tube 3 from the larger tank 8, to which the trough is connected, and is regulated by a valve in the tube actuated by the lever 7, controlled by the float 6 to open the valve against the flow and pressure from the tank 8 when the float descends as the bowls are emptied and close the valve when the float ascends, limiting the height of the water in the bowls and chamber to about the line 10. Watering-troughs of this kind have heretofore been constructed with the bottom of the drinking-bowls and float-chamber one continuous level floor and the roof of the chamber 4 and partitions or walls 4' and 4" in separate pieces and separately attached to the main body of the trough. In the old construction mentioned above mud accumulates in the bottom of the chamber and litter on top of the water in the chamber until the operation of the float is obstructed, to remedy which I have elevated the floor beneath the chamber above the floors 12 and 12' of the bowls, and to more effectually repel and automatically wash out the mud and litter I have inclined the chamber-floor downward from a central cross-ridge 5' in planes 5 and 5" toward and continuous with the floors 12 and 12' of the bowls, as shown in Fig. 1. The float-chamber is formed by the roof-plate 4, and the partitions or walls 4' and 4", which separate the chamber from the drinking-bowls, are cast integral with the roof-plate, thereby strengthening the roof-plate, by which they are alone supported. The back 1 and front 2 of the main body of the trough forming the back and front of the chamber are extended upward at this point to give the chamber the required height. The gain 19 at rear end of the roof-plate engages the shank of the T-shaped lug 13 at the top of the back, and the gain 18 at the fore end of the plate receives the ear 14 on the front and is locked in place by the bolt 15, which is passed through the ear and end of the brace 9. The plate and partitions have the ribs 17 17 to give the required strength with less metal and avoid the necessity of lugs or channels in the front and back to support the partitions, thus leaving the inside of the body smooth for cleaning and the partitions less liable to become rusted fast to the back and front. The fore ends of the partitions, beveled to fit the splay of the front, allow the fore ends of the partitions and the roof-plate to be raised for removal when repairs or cleaning is necessary. The lower edges of the partitions are a little below the top of the floor of the chamber and above the floors of the bowls, so that the supply of water can pass under the partitions from the chamber.

In operation if the bowl A is quickly emptied, as shown in Fig. 1, the water-line falls to 11 in the bowl A', the partition 4'' prevents any floating object being carried into the chamber, and its lower edge is remote enough from the bottom so that the current caused by this draft will not carry in any deposit of mud from bowl A'. If both bowls are emptied, it is obvious that the supply from 3 striking on the ridge 5' of the raised floor of the chamber will tend to carry all mud and debris out into the bowls, where it may be readily removed.

Having fully described my invention, what I claim, and desire to secure by Letters Patent, is—

1. In an automatic watering-trough the following combination; a drinking-bowl in communication with a chamber having a floor higher than the floor of the drinking-bowl, and a float in the chamber to control the water-supply substantially as described.

2. An automatic watering-trough consisting of a drinking-bowl having communication under a partition between the bowl and an adjacent float-chamber with said float-chamber the floor of which is inclined downward toward the floor of the drinking-bowl substantially as described.

3. An automatic watering-trough having in combination a chamber to receive the water-supply, and a float in the chamber connected to control the supply, and the floor of the chamber inclined downward toward the floor of a drinking-bowl having communication with the chamber along said floors substantially as described.

4. An automatic watering-trough having a drinking-bowl at each end, and an intermediate chamber containing a float connected to regulate the water-supply, the floor under the chamber higher than the floors of the bowls, and the lower edges of the partitions between the bowls and the chamber set above the floors of the bowls and lower than the top of the floor under the chamber substantially as described.

5. An automatic watering-trough having a drinking-bowl in each end in communication along the floor with an intermediate float-chamber, the floor beneath the chamber raised to form a cross-ridge and inclined downward toward each bowl, and the partitions separating the float-chamber and bowls extending down a little below the summit of the cross-ridge substantially as described.

6. An automatic watering-trough having a drinking-bowl in each end communicating along the floor with an intermediate chamber to house a float to control a water-supply to the chamber, the floor beneath the chamber formed with a ridge directly under the supply and inclined from the ridge downward toward each bowl substantially as described.

TRUMAN E. STEVENS.

Witnesses:
G. W. BURTON,
F. W. KINNEY, Sr.